UNITED STATES PATENT OFFICE.

CURT PHILIPP, OF DRESDEN, GERMANY, ASSIGNOR TO CHEMISCHE FABRIK VON HEYDEN AKTIENGESELLSCHAFT, OF DRESDEN, GERMANY.

PROCESS OF MAKING CAMPHOR FROM ISOBORNEOL.

No. 849,018.      Specification of Letters Patent.      Patented April 2, 1907.

Application filed May 4, 1906. Serial No. 315,202.

*To all whom it may concern:*

Be it known that I, CURT PHILIPP, a subject of the King of Saxony, and a resident of Dresden, Tieckstrasse 8, Kingdom of Saxony, German Empire, have invented new and useful Improvements in the Manufacture of Camphor from Isoborneol, of which the following is a specification.

Borneol and isoborneol when heated with concentrated nitric acid to 40° to 50° centigrade behave so differently that Tschugajew has founded on this fact an easy method of distinguishing them. (See *Chemiker-Zeitung* 1902, p. 1224.) Hesse, in the *Berichte der Deutschen Chemischen Gesellschaft*, 1906, p. 1144, has confirmed Tschugajew's observations. According to this by heating borneol to 40° to 50° centigrade with concentrated nitric acid red vapors are produced and camphor is obtained, which precipitates on diluting with water. Isoborneol, on the contrary, produces with concentrated nitric acid at 40° to 50° centigrade neither red vapors nor camphor, but after precipitating with water a thick yellow oil which apparently contains nitrogen.

Isoborneol behaves differently when boiled with concentrated nitric acid. Bertram and Walbaum, in the *Journal für Praktische Chemie*, vol. 49, p. 10, explain that isoborneol is oxidized to camphor when boiled with nitric acid. This reaction, however, cannot be applied in practice. Although vessels actually exist which will withstand for some time the working with boiling nitric acid, it is to be noted that the oxidation of isoborneol to camphor by boiling with nitric acid soon reaches explosive intensity and the yield becomes an insufficient one. For the practical application it has therefore been proposed to oxidize the isoborneol to camphor by means of nitrous acid or of permanganate, (German Patent 157,590,) or chlorin, (claim of German application B.37,228 and B.37,281,) or hypochlorites, (British Patent 2,520, 1906,) or oxygen, (German Patent 161,523,) or ozone, (German Patent 161,306.) Isoborneol can also be oxidized to camphor by means of nitric acid in technical process with almost theoretical yield, if this is done in the presence of traces of nitrous gases. While in the absence of nitrous gases nitric acid at 40° to 50° does not oxidize isoborneol to camphor, but converts it to a thick yellow oil, nitric acid containing even traces of nitrous gases oxidizes isoborneol at this temperature to camphor in a reaction, which can be easily regulated. It does not matter whether a nitric acid containing nitrous gases is applied or whether care is only taken that substances developing nitrous gases from nitric acid are present. It therefore is sufficient, for example, that to the nitric acid or to the isoborneol to be oxidized, or to the mixture of both, small quantities of organic or inorganic substances are added, such as are oxidized by nitric acid while forming lower oxy compounds of nitrogen. Such substances are, for example, hydrochloric acid, metals like copper, arsenious acid, or organic substances, such as amylum and borneol itself, &c. When starting from an impure isoborneol already containing substances which can be oxidized by nitric acid—for example, borneol—further substances of this kind need not of course be added. Only very small quantities of nitrous gases or bodies producing same are necessary for starting the oxidation.

Example: Five grams sodium nitrite (NaNO$_2$) are added to one hundred and twenty-five kilograms nitric acid of 1.4 specific gravity. Then twenty-five kilograms isoborneol are by portions stirred into the mixture. Spontaneous heat soon causes oxidation to begin. By exterior cooling and by regulating the supply of isoborneol care is taken that the temperature does not rise above 40° centigrade. After the whole quantity of isoborneol is added stirring is continued until the development of nitrous gases has ceased. Thereafter the vessel is emptied, and the camphor nitrate floating on the acid is drawn off. It then is decomposed by mixing it with water, and the precipitated camphor is filtered off. If an isoborneol is used for oxidation containing small quantities of borneol or other substances which react with nitric acid, reducing it to lower oxy compounds of nitrogen, pure nitric acid may be used, as stated before, which does not yet contain nitrous gases, as the latter are formed from the nitric acid by the action of such impurities on pure nitric acid.

I claim—

An improvement in the process of making camphor from isoborneol, which consists in adding isoborneol to nitric acid below the boiling-point of the latter, taking care that the reaction is brought about by the presence of small quantities of lower oxy compounds of nitrogen, substantially as and for the purpose specified.

In testimony that I claim the foregoing as my invention I have signed my name, in presence of two witnesses, this 23d day of April, 1906.

CURT PHILIPP.

Witnesses:
PAUL E. SCHILLING,
PAUL ARRAS.